United States Patent [19]

Wahlman et al.

[11] Patent Number: 5,485,453
[45] Date of Patent: Jan. 16, 1996

[54] METHOD FOR HANDLING REDUNDANT SWITCHING PLANES IN PACKET SWITCHES AND A PACKET SWITCH FOR CARRYING OUT THE METHOD

[75] Inventors: Jan S. R. Wahlman, Kista; Hans A. P. Berghager, Älvsjö ; Leif M. Larsson, Stockholm, all of Sweden

[73] Assignee: Telefonaktiebolaget L M Ericsson, Stockholm, Sweden

[21] Appl. No.: 196,485

[22] Filed: Feb. 15, 1995

[30] Foreign Application Priority Data

Feb. 15, 1993 [SE] Sweden .................................. 9300485
May 27, 1993 [SE] Sweden .................................. 9301805

[51] Int. Cl.$^6$ .................................................. H04L 12/56
[52] U.S. Cl. ............................ 370/16; 370/60.1; 340/827
[58] Field of Search .............................. 370/16, 94.1, 60, 370/60.1, 94.2, 94.3, 94.1; 371/8.1, 8.2, 11.1, 11.2; 340/827, 825.03

[56] References Cited

U.S. PATENT DOCUMENTS

| | | | |
|---|---|---|---|
| 5,153,578 | 10/1992 | Izawa et al. ........................... | 370/16 |
| 5,200,950 | 4/1993 | Foglas et al. ......................... | 370/16 |
| 5,301,184 | 4/1994 | Uriu et al. ............................ | 370/16 |

FOREIGN PATENT DOCUMENTS

| | | |
|---|---|---|
| 0381334A2 | 8/1990 | European Pat. Off. .. |
| 0453607A1 | 10/1991 | European Pat. Off. .. |

*Primary Examiner*—Benedict V. Safourek
*Assistant Examiner*—Dang Ton
*Attorney, Agent, or Firm*—Burns, Doane, Swecker & Mathis

[57] ABSTRACT

A switch for the transfer of data packets comprises in the conventional way input ports and output ports and parallel switching planes, which are identical to each other. The switch establishes connections between input ports and output ports through the parallel switching planes. In each output port there is for each switching plane and each established connection a buffer accommodating at least one data packet. In the output port there is in addition a logical selection device for selecting data packets from the switch and from the different planes in such a way, that a data packet stream, which is as correct as possible, is obtained from the output port, and it selects in the first place data packets from a switching plane, which is the preferred plane at each instant. The selection device comprises a quality determining unit, which at each occasion determines the preferred plane by means of quality values for each plane. These quality values are determined by means of an evaluation of earlier data packets, which have arrived to the output port.

41 Claims, 8 Drawing Sheets

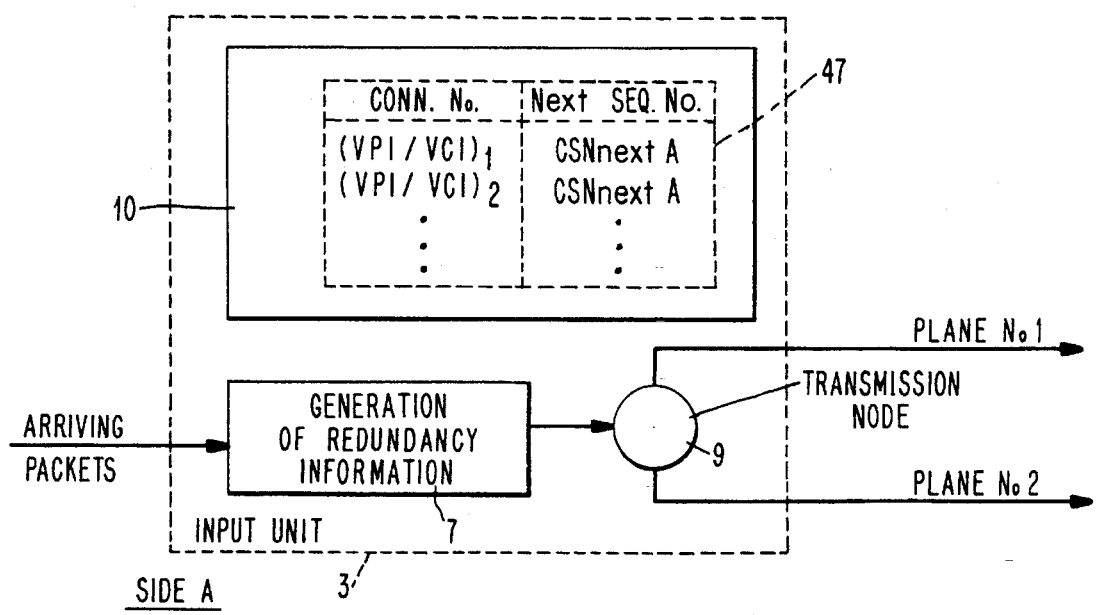
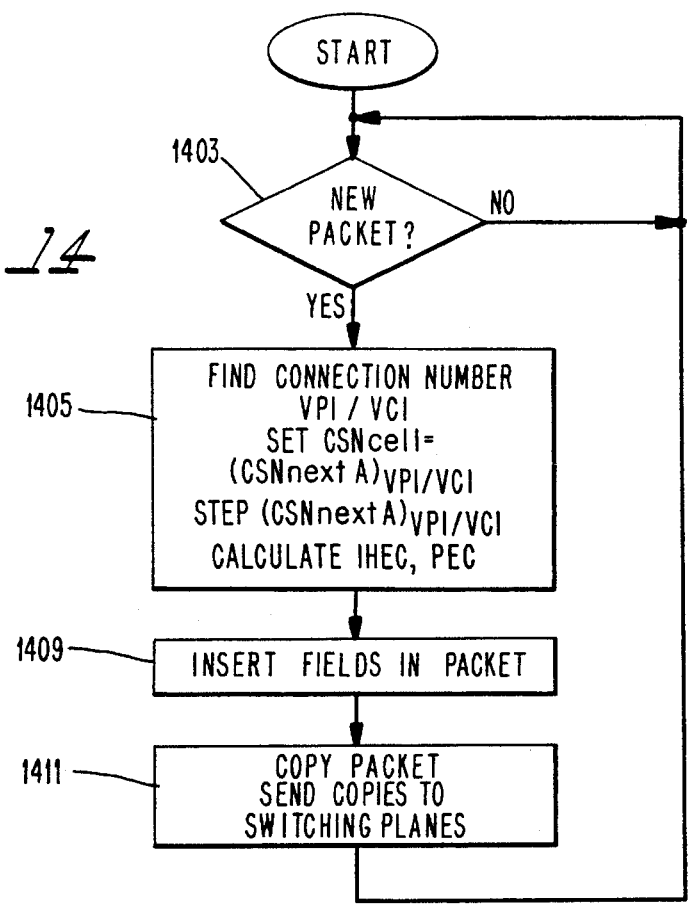

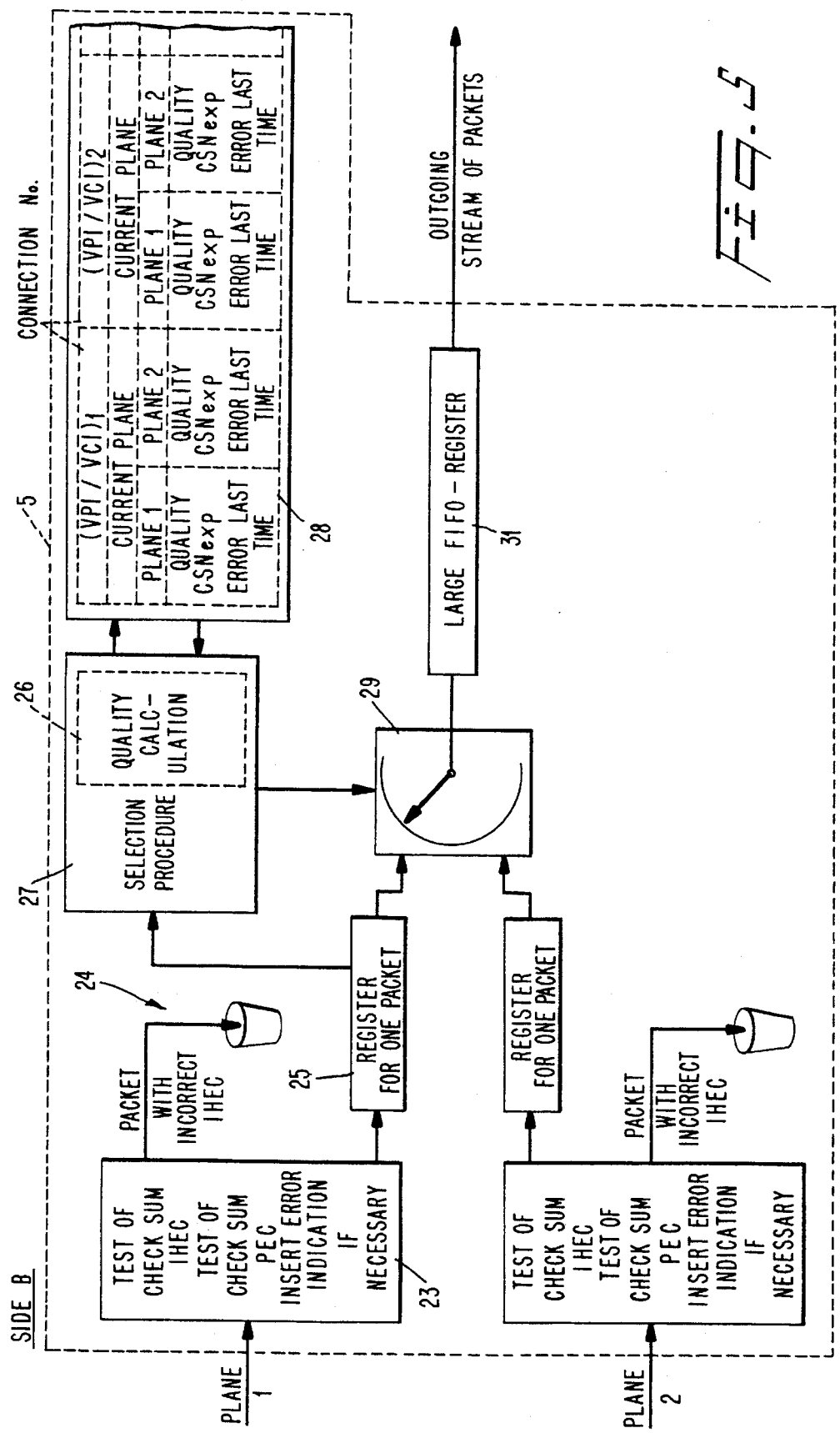

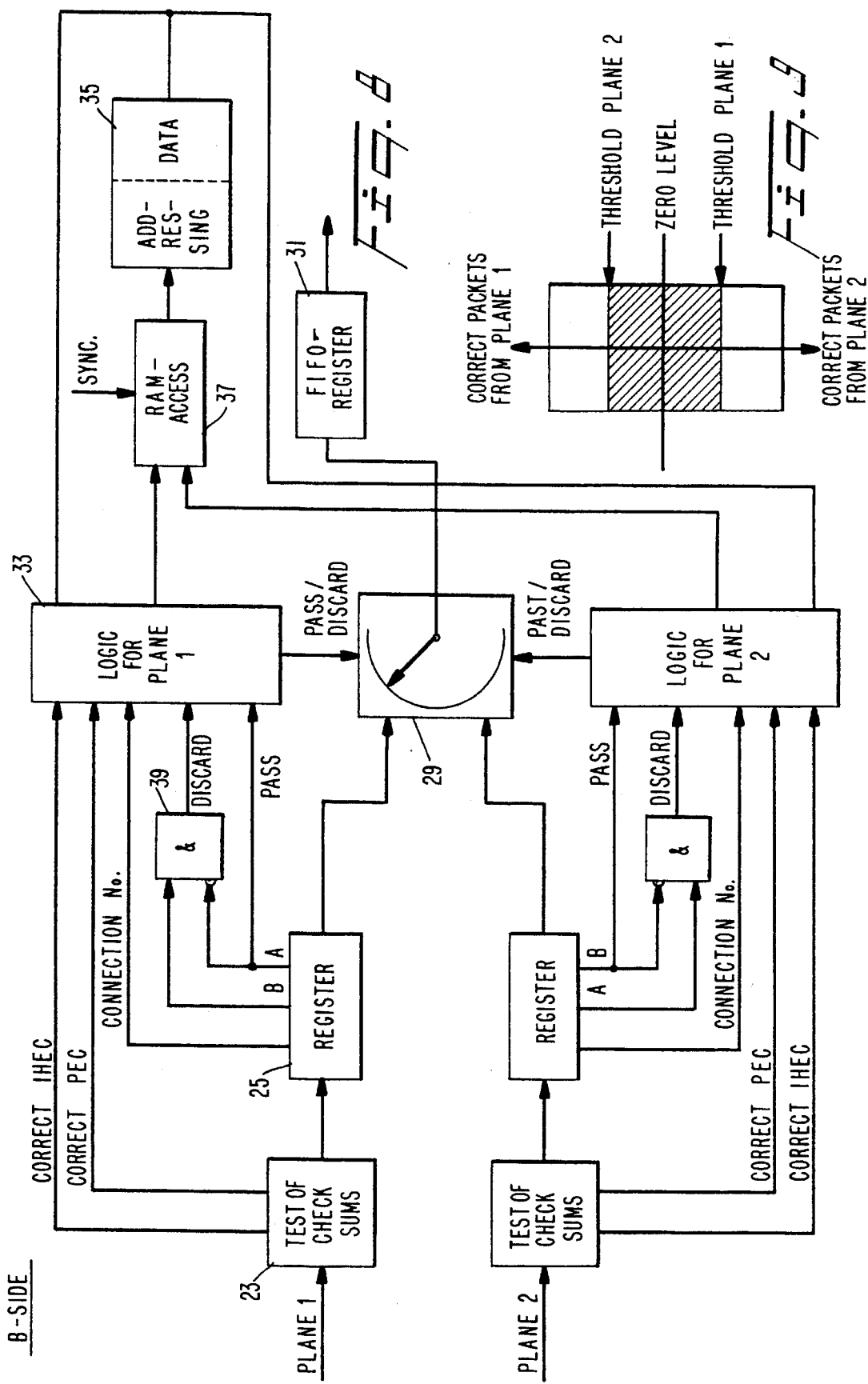

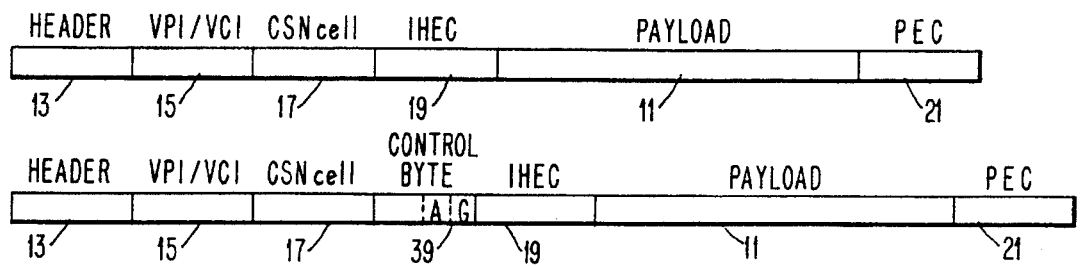
Fig. 10
Fig. 11
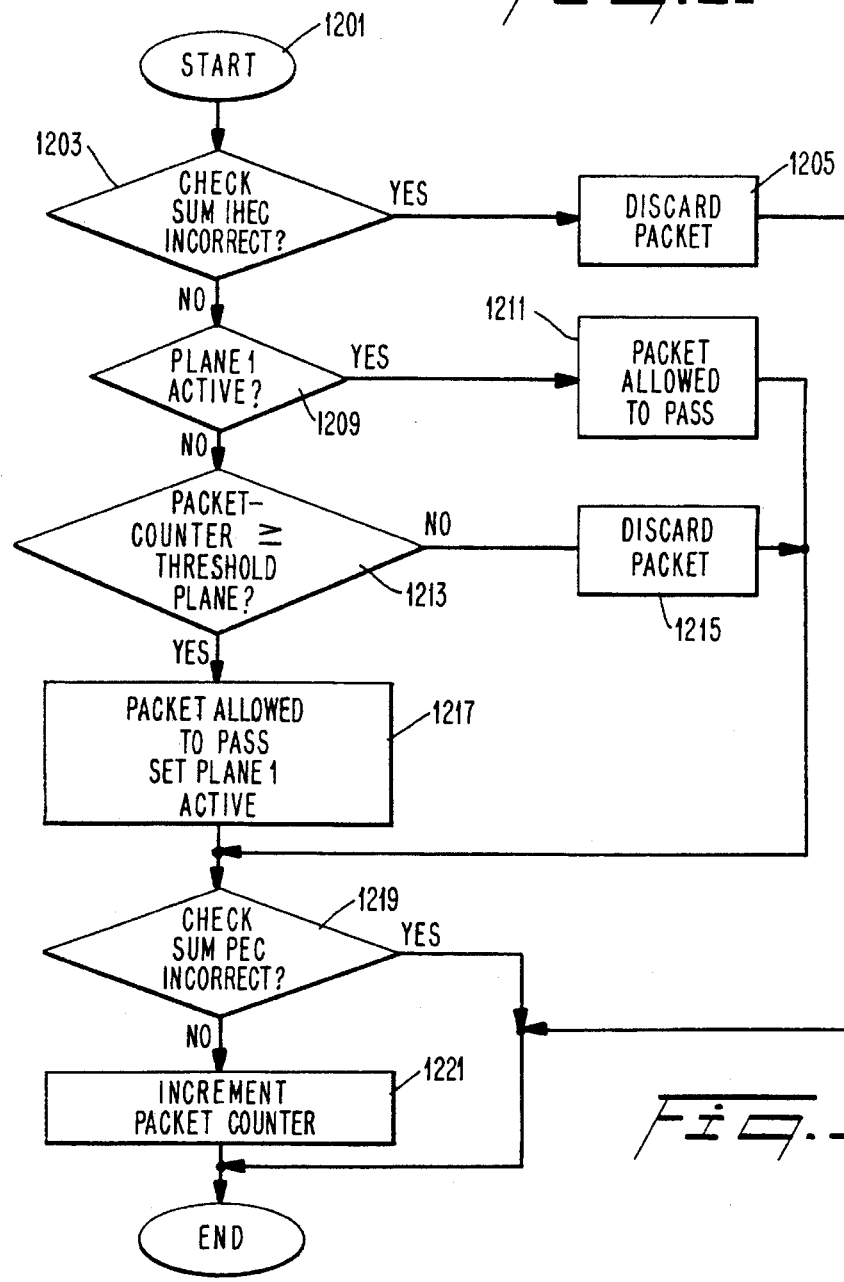
Fig. 12

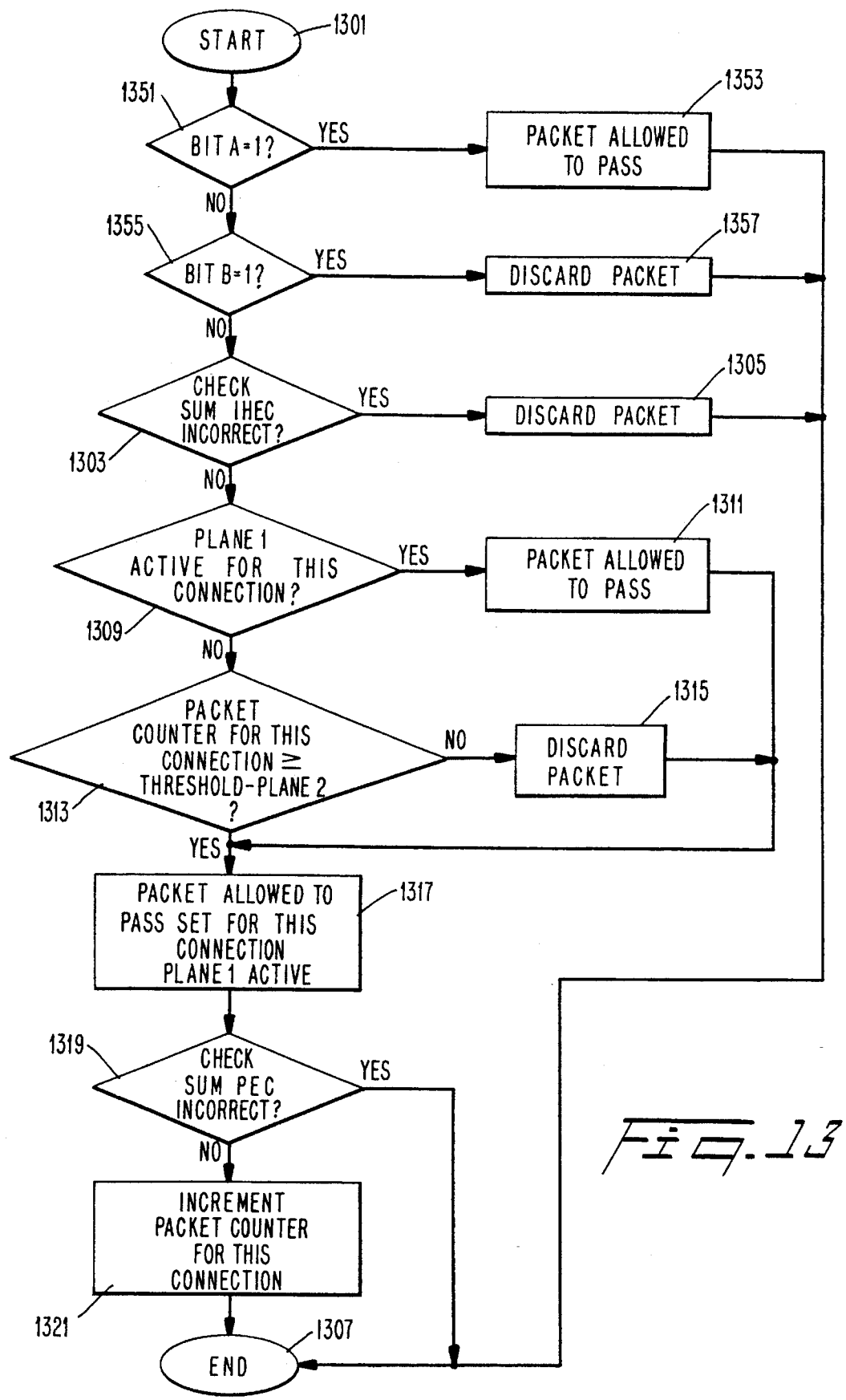

METHOD FOR HANDLING REDUNDANT SWITCHING PLANES IN PACKET SWITCHES AND A PACKET SWITCH FOR CARRYING OUT THE METHOD

BACKGROUND OF THE INVENTION

The invention is related to a method for handling parallel and independent switching planes in a packet switch and a packet switch by means of which the method can be performed.

In order that a switch in a network for the transfer of data packets, for instance an ATM-network, will be able to satisfy the requirement of a high reliability, some form of redundancy is required, that is that some parts of the hardware of the switch are made as double or multiple units, which perform exactly the same operations and operate in parallelity to each other. A common way of providing this redundancy is by means of parallel and independent switching planes.

The transfer of data packets in a packet switch may be incurred with errors, so that for instance individual data packets disappear, will be wrongly addressed or that bit errors appear in the data packet. These errors can then be detected, when the data packet is to be forwarded from the packet switch. If several switching planes are provided, the task thus is to grasp and forward, at the output port of the packet switch, only the data packets transferred without errors and also monitor that the data packets are forwarded in a correct sequential order. In packet networks and particularly ATM-networks it is, to some extent, in addition permitted that data packets are lost or discarded. For instance, the buffers necessary for the handling of the statistical multiplexing in a packet switch can be filled, whereafter data packets arriving to the buffer may be lost. Having a redundancy in the switch, for instance with parallel switching planes, this means that the same data packet in the different planes is not available at the same time at the output port of the switch, where the redundancy is terminated, that is in the connection point of the parallel switching planes.

These different errors can, as has been observed above, be detected when the data packets leave the individual switching planes to be forwarded from the packet switch. The reliability and the communication quality can here be improved and the forwarding made quicker by selecting "the best switching plane" according to some algorithm, i.e. data packets are selected first from that switching plane which in some respect can be considered to have the best communication quality.

A change of the preferred switching plane must in this case be performed in a controlled way such that, due to the possibly varying communication velocity on the different planes, data packets are not lost or unnecessarily doubled in such a change of preferred plane.

The European patent application EP-A1 0 381 334 discloses the handling of asynchronous, redundant digital data messages. Several parallel and equivalent communication channels are each one connected to an own buffer. The various data messages which have been received in an arbitrary order are sorted and a majority choice is performed to determine the channels which have correct data messages.

In the European patent application EP-A1 0 453 607 a packet switch is disclosed having redundant switching planes. For each output port from the switch there is an evaluation unit, which receives data packets from the different switching planes and in the common way selects data packets having no errors but also selects preferably or in the first place data packets from that switching plane on which the data packets are communicated in the most slow way. For each connection there is at the output side a counter provided for each one of the switching planes where the counter for a plane, on which a packet has been correctly transferred, is increased by a fixed amount and the counters for the other planes are decreased by another smaller amount. The preferred plane from which packets will be chosen in the first place is the plane having the lowest value in its associated counter.

SUMMARY OF THE INVENTION

It is a purpose of the invention to provide a method and a packet switch according to what has been said above having a simple and efficient choice of a preferred switching plane for accessing those data packets which are to be forwarded from the packet switch, permitting that an outgoing data packet stream is as correct as is possible or reasonable.

It is a further purpose of the invention to provide a method and a packet switch according to what has been said above comprising, in the determination of quality of the different switching planes, a detailed evaluation of the stream of data packets passing through the switch allowing an improved choice of a preferred switching plane for accessing those data packets which are to be forwarded from the packet switch.

According to the invention a method and a packet switch are provided achieving the purposes mentioned. The detailed characteristics and the scope of the invention appear from the appended patent claims.

Thus, statistics are collected for the data packets which have been transferred on each switching plane. From these statistics at each instant that switching plane is determined having the best communication quality. Data packets are selected in the first place from this plane until some other switching plane is judged to be better. The selection of a switching plane can be performed either for each packet communicated through the switch to an output unit or port, for each established connection or on each link between an input unit or port or an output unit or port of the switch unit, where on each link thus generally multiple simultaneous connections may be established.

Thus, a switch for the transfer of data packets has input units and output units and switching planes which are identical and parallel to each other. The switch may advantageously be arranged to establish several logical connections between input units and output units on the parallel switching planes. In each output port there is, for each switching plane and possibly in combination with each input unit or port of the switch or with each established connection, a buffer accommodating at least one data packet. In the output unit or port there is a selection device to select from the switch, data packets from the different planes in such a way, that a data packet stream which is as correct as possible is obtained from the output port or resembles as closely as possible the stream of data packets incoming to the switch. The selection device is arranged, in the first place, to select data packets from one, at each instant preferred switching plane. Further there is a quality determining unit provided at the output port, possibly comprised in the selection device, which at each instant, for instance when a data packet arrives to the output port, determines the preferred plane by means of quality values of each plane, which in turn are determined by means of data packets arrived previously to that output port.

Further, it is preferred that the change of a preferred switching plane is not performed until another switching plane has a quality value which is better or higher than the quality value of the preferred plane and which deviates therefrom with an amount which is better or higher than a predetermined value. This will provide a hysteresis in the choice of a preferred switching plane, such that the preferred switching plane is not changed too often. This may be advantageous since hereby the total time consumption of the changes of the preferred switching plane will be reduced.

The currently preferred switching plane can be common to all connections or also be specifically or individually determined for each input port to the switch or for each connection.

In the corresponding way the quality value of each plane may be the same for all connections and input ports or be specifically or individually determined for a considered input port or a considered connection.

In the latter cases then, new quality values for a particular input port or connection and for the switching planes can be determined each time when a data packet arrives to the output port from the considered input port or on the considered connection respectively.

The quality value of particular plane and possibly in combination with a particular input port or a particular connection is advantageously determined guided by detected errors in data fields within data packets which have been transferred earlier to the output port on this plane, possibly only for data packets communicated from the considered input port or the considered connection respectively. Therefore, there is at each output port error checking units evaluating check sums in data packets communicated through the switch.

The quality value of a particular plane and possibly of a particular input port or connection respectively can advantageously also be determined guided by errors in the sequential order of data packets previously communicated on this plane to the output port, possibly only for data packets communicated from the considered input port or the considered connection respectively. Since normally a sequential number is added to the data packet in the transfer thereof in a packet switch, the sequential number may be transferred from the buffer at the output port to the quality determination unit for evaluation of the sequential correctness of the packet.

The quality value of a particular plane and possibly also of a particular input port or a particular connection respectively can further advantageously, by the quality determining unit be changed with a certain amount and in such a direction, that the quality will be better or higher for this plane possibly in combination with the connection, at each time when a correct data packet arrives to the output port through this switching plane and possibly from the considered input port or belonging to the considered connection respectively.

The quality value also for the other planes, possibly in combination with the considered input port or the connection respectively, can also, by the quality determining unit be changed with a certain amount and in such a direction that the quality will be worse or lower for these planes possibly only in combination with the input port or the connection respectively, at each time when a correct data packet, through a switching plane and in the corresponding cases from the corresponding input port or belonging to the considered connection respectively arrives to the output port.

The quality value of a plane possibly in combination with a considered input port or connection, can advantageously be changed with a certain amount and in such a direction that the quality will be better or higher for this plane, possibly in combination with the input port or the connection respectively, at each time when a data packet, through this switching plane and in the corresponding cases from the considered input port or belonging to the considered connection respectively, arrives in a correct sequential order to the output port.

When only two switching planes are provided, the quality value of each plane may be substituted by a common quality value. Positive or high values for this common quality value can then indicate, that the communication is best on a first one of the two switching planes, while negative or low values indicate that the communication is best on the second switching plane. Hysteresis is then obtained in the corresponding way as above, such that errors in a single data packets not will cause a change of plane.

The selection device can in this case also comprise the quality determining unit and can further, advantageously be divided into one selection device for the first plane and one selection device for the second plane, which will operate substantially independently of each other and only have access to a common memory, where information is stored in regard of the switching plane which is preferred at each instant and the common quality value. Such a division can give a quicker handling of the data packets in order to obtain a good output stream of data packets and it may also, with some modification, be used in the more complicated selection methods described above. The division will, however, become particularly efficient when using a quality value common to the two planes.

BRIEF DESCRIPTION OF THE DRAWINGS

The invention will now be described with reference to the accompanying drawings, on which FIG. 10 shows the format of a data packet transferred through the switch, FIG. 11 shows an alternative format of a data packet having control information for a forced control of the handling at the output port, FIGS. 12 and 13 illustrate flow diagrams of logical procedures which are performed at the output port in the embodiment according to FIG. 8 without and with respectively, a forced control of the handling of data packets at the output port, FIG. 14 shows a flow diagram illustrating the handling of a data packet at the arrival thereof to a packet switch.

DETAILED DESCRIPTION

Figure 1:
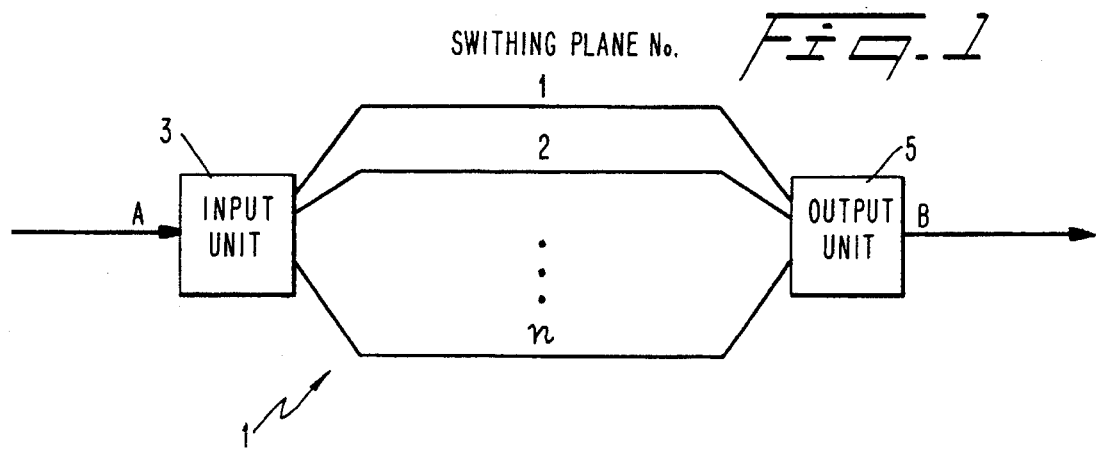
FIG. 1 is a schematic picture of a switch having parallel switching planes.

In FIG. 1 the construction of a packet switch 1 is schematically illustrated. The switch 1 comprises inputs at the input side or side A, which are here represented by an input unit or input port 3, and a number of output ports at the output side or side B, which are here represented by an output unit or output port 5. The input unit 3 and output unit 5 are connectable by means of logic of the packet switch, that is the logic circuits inside the switch core, wherein electrical connections or links are established in parallel on n multiple switching planes. A data packet which arrives to side A and thus to the input unit 3, generates n identical data packets which are forwarded on the n switching planes, where the communication of these identical data packets are performed totally independently of each other on the different switching planes. These identical data packets then arrive to the output unit 5 and therein correctly transferred data packets are selected and a sequence or stream of output data packets is created having a correct sequential order of the different data packets. In the output unit 5 thus is selected, in some way, only one of the transferred identical data packets corresponding to an incoming data packet, which has previously arrived to the input unit 3.

Figure 2:
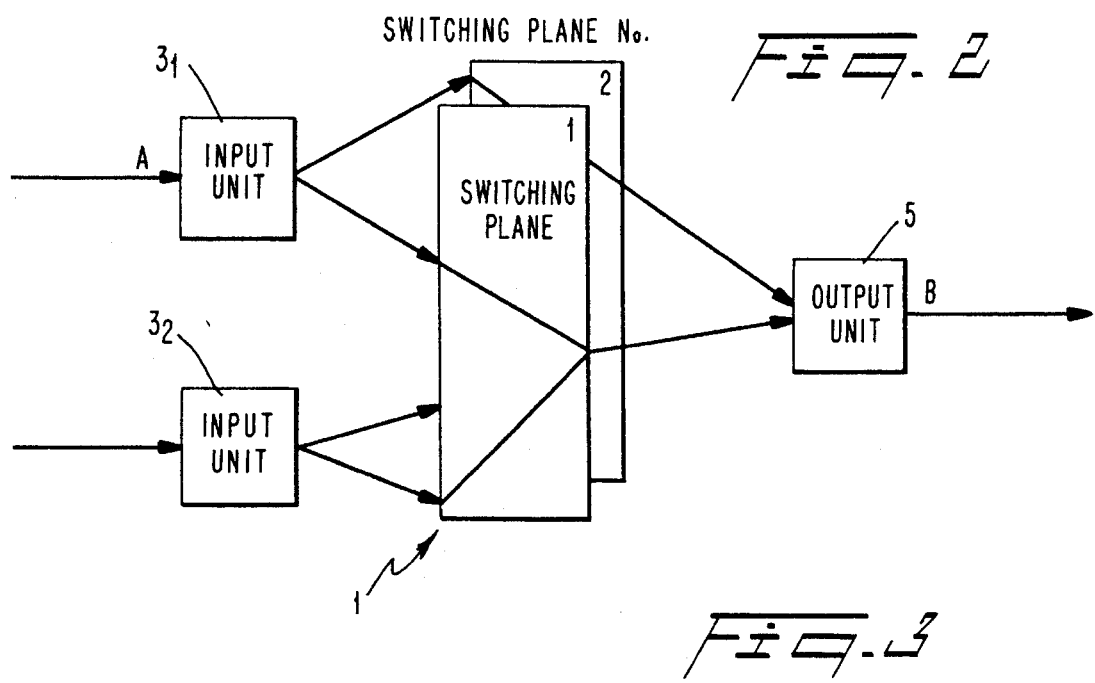
FIG. 2 is a schematic picture of a switch where all data packets are taken from only one plane.

In FIG. 2 a switch is illustrated having two switching planes which are numbered 1, 2, and two input ports $3_1$ and $3_2$ and an output port 5. In the case illustrated here, switching plane No. 1, is active, i.e. a selection procedure present in the output port 5 selects in the first place data packets which have been communicated on plane No. 1. This is true for all data packets independently of the input port, on which they have arrived to the switch. This selection method may then be indicated as "selection per link". The switching plane, which has been determined to be the best one by means of some election criterion, is set to be active. This choice procedure can very simply be performed in the logical circuits of the output unit, but the disadvantage of this "choice per link" naturally is that single errors in a switching plane, for instance at some intermediate point, through which only some data packets pass, will result in a change of active switching plane in spite of the fact that this switching plane may give a correct transfer of other data packets.

Figure 3:
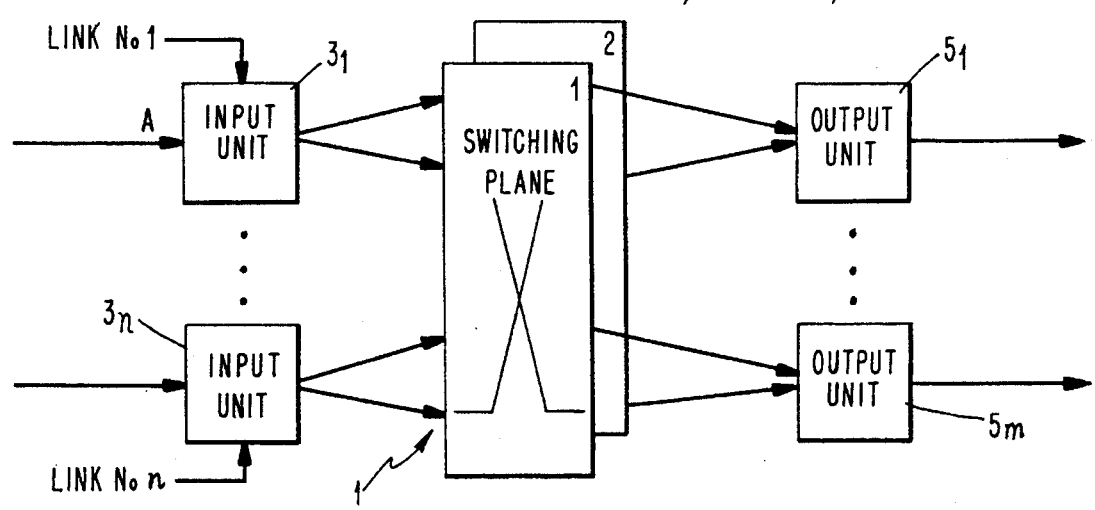
FIG. 3 is a schematic picture of a switch, where all data packets from a particular input port always are taken from only one switching plane, FIG. 4 schematically shows the handling of a data packet at the arrival to the packet switch, FIG. 5 schematically illustrates the handling of data packets at the arrival thereof to an output port of the switch after the transfer through a switch.

Another possibility eliminating this disadvantage is illustrated in FIG. 3 for a packet switch 1 having input units $3_1$, ... $3_n$, two switching planes having Nos. 1, 2 and output units $5_1$, ... $5_m$. For a particular considered output unit, for data packets arrived to the switch at a particular input port $3_i$, in this case data packets are selected in the first place from one of the two planes. This choice procedure can be indicated as "choice per path". In order to perform the method some identification is required of the input port on which the data packet has arrived to the switch 1. In the case illustrated in the Figure this may be achieved by arranging that in each input port $3_1$, ... $3_n$, the order or logical number 1, ..., n of the input port is inserted in the data packet or added thereto. This number is then used by logic circuits in the output port, to which the data packet is communicated inside the switch, for the choice of a preferred plane for the considered input unit, and the number is here also removed from the data packet. The switching plane 1 can thus be the preferred plane for a certain input and the switching plane 2 for other inputs.

Another possibility for the choice of a preferred redundant plane is given by utilizing information, which conventionally already exists inside or in any case will be added to and inserted in a data packet when it arrives to an input port of the switch, and which is required for the identification of the data packet. Only this case will be considered hereinafter and more specifically the fact is utilized that each data packet belongs to or is associated with a logic connection. Such a logic connection is established through the whole packet switching network (not shown in the Figures), and in particular through each switch 1, when initially a request of the communication of information is received from a terminal (not shown) in the network. This choice procedure may then be indicated as "choice per connection". A modification of the normal procedure at the arrival of the data packet to the switch is thus not required in this case.

In FIG. 4 the handling or processing of the data packets at the incoming side A is schematically illustrated, in a normal transfer through a packet switching network, i.e. after arrival of a packet to an input unit 3 of a switch 1, before the data packets are issued on the switching planes, which in the case illustrated here are two. In the following it will also always be assumed that there are only two switching planes having the order numbers 1 and 2. In a processing unit 7 particular information is generated, redundancy information and/or administrative information, and it is added to or inserted in a data packet, before it is transmitted simultaneously into the two switching planes Nos. 1 and 2 through a transmission node 9. The generation unit 7 stores and reads required information for its operation from a memory 10 comprising various data fields.

In FIG. 10 the configuration of the data packets are illustrated, after the passage through the generating and processing unit 7. The data packet thus comprises the proper or real information which is to be transmitted through the whole switching network from a source terminal (not shown) to a destination terminal (not shown) and which is located in a field 11, here called "Payload". In addition, the original or real data packet may contain an initial field 13, here indicated as "Header", which can contain both general and other administrative information in regard of the data packet, such as the address of the destination terminal, the address of the source terminal, i.e. the origin address, information relating to priority, channel number, etc.

In the unit 7 for the generation of the extra information required for the transfer of a data packet inside the switch 1 a field 15 is inserted in the data packet containing an internal connection number, called "VPI/VCI", in a field 17 a sequential number, "CSNcell", and two check sums, "IHEC"="Internal Header Error Check" and "PEC"="Payload Error Check". The check sums are found in fields 19 and 21 respectively in the completed data packet. The first check sum "IHEC" in the field 19 is thus related in particular to the information comprised in the various administrative fields 13, 15, 17 in the complete data packet, while the check sum "PEC" in the second field 21 is related particularly to the real or original information contents of the data packet, "Payload", in the field 11.

The internal connection number "VPI/VCI" may in the unit 7 be obtained from information of a logical connection to which the data packet belongs, and this number is unique for each such logical connection. The sequential number "CSNcell" is taken from a field or register in a table or list 47 in the memory 10 (see FIG. 4) and indicates in some simple way, for each logical connection number "VPI/VCI", the sequential order of data packets in the stream of data packets which is transmitted over the established logical connection, such that for instance the first data packet being sent on a connection is given the sequential number 1, the second one the sequential number 2, etc. Owing to the generally limited length of the field 17 provided for the sequential number "CSNcell" and since often a very large number of packets are transferred for each connection, an increasing sequence of sequential numbers will after some time inevitably achieve the highest number which can be accommodated in the field 17. Then the sequential numbers are restarted from the beginning. The sequential numbers will thus return cyclically, modulo the highest number which can be represented in the field 17. In the following such an increasing, consecutive numbering modulo some number is supposed to be valid for the sequential numbers "CSNcell".

The connection number "VPI/VCI" in the field 15 can in certain cases also be inserted in the data packet before arrival of the packet to the switch 1.

In FIG. 14 a flow diagram is shown for the handling of data packets in the input unit 3 of the switch 1. The diagram starts in a block 1401 and after that in a block 1403 it is decided, if a new data packet has arrived. If it is not the case, the block 1403 is repeated again and again, until a data packet has arrived to the input unit 3. Then the extra internal information is generated which is necessary for the simultaneous transmission of the data packet 21 on the multitude of redundancy planes, as is indicated at 7 in FIG. 4 and in a block 1405 in FIG. 14. It means, as has been indicated above, that the logical connection to which the data packet belongs is determined and the corresponding internal connection number "VPI/VCI" is found or generated, that the internal sequential number "CSNcell" of the data packet is set equal to the next current sequential number "CSNnextA" for this connection which is taken from a field associated with this connection in the list or table 47 (FIG. 4). After that the contents "CSNnextA" in the field in the list 47 is increased to the number of the next data packet, i.e. in the case treated here generally increased by the number 1 and considering that the sequence order of the sequential numbers is modulo some number. At last in the block 1405 the check sums "IHEC" and "PEC" are calculated, as has been indicated above.

In a block 1409 then these new fields are inserted in the data packet. In a block 1411 the data packet modified hereby is copied, transferred to suitable registers (not shown, associated with the node 9) for the different switching planes and are transmitted on these. The routine is then terminated and the program flow returns to the block 1403 to decide if any new data packet has arrived to side A.

At the output side or side B of the switch 1, in an output unit 5 the data packets are processed by a procedure performed by various units which are schematically illustrated in FIG. 5. When data packets have passed through the interior of the switch unit 1, on the different switching planes, the data packets arrive to redundancy terminating circuits, i.e. circuits which process the transferred data packets and select data packets to be forwarded from the output unit 5, such that a stream of data packets is forwarded in which the sequential order of the individual packets is as correct as possible and also the proper information field in each packet is as correct as possible.

First it is checked by a unit 23, as is indicated in FIG. 5, that the information in the data packet has been communicated correctly through the switch 1 and in particular that the check sum "IHEC", which is intended for the administrative portion of the data packet, is correct. If this check sum "IHEC" proves to be incorrect, the data packet is discarded, as is indicated at 24, since it then can have been given a wrong label, wrong addresses, a wrong sequential number, etc. in the communication on the corresponding switching plane. Also the check sum "PEC" related to the real information contents of the data packet in the field "Payload" is calculated and is corrected, if necessary. In a possible correction of this check sum an indication thereof is inserted in the data packet.

However, if the check sum "IHEC" for the administrative fields of the data packet is correct, the data packet is transferred to a register 25 which is configured to store only one data packet. Then a special procedure is performed in a selection unit 27 performing a selection algorithm, for selection of the register 25 from which the data packet is to be forwarded from the output unit 5 and the entire switch 1. In a determination of quality values of the planes, which will be described more closely hereinafter, the logic selection unit 27 comprises a unit 26 for the calculation of these quality values. From the registers 25 the selection procedure performed by the selection unit 27 receives various information relating to the stored data packet such as its connection number "VPI/VCI" and its sequential number "CSNcell".

The selection unit 27 controls a switching or selecting device 29, which is connected to the registers 25 to select the data packet therefrom, that is to select data packets from a suitable or preferred switching plane. By means not described here, data packets which are located in or taken from the register 25 of this preferred switching plane, are transferred to a FIFO-type output register 31, in such a way that an output stream is obtained which is as correct as possible. The output register 31 must be rather large and should be able to accommodate several data packets which are ready to be forwarded from the switch 1. The algorithm performed by the unit 27 for selection of data packets uses among other variables the above mentioned quality values for each connection and each plane or only for each plane to elect a plane preferred at each instant.

If it can be presupposed that the copies of the same data packet which are communicated on the two planes, arrives to the output 5 approximately simultaneously, i.e. approximately at the same time are stored in the respective registers 25, no resequencing of the communicated data packets or other complicated logic is required for achieving the best possible forwarded sequence of data packets. If for instance a data packet having a particular sequential number "CSNcell" is not found among the packets transmitted over a particular plane, such a logic would be able to try to find this packet among the data packets transmitted on the other plane. It would require a buffer storage for several data packets for each plane at the output port. Such a solution is described in the simultaneous patent application having the title "A method for handling redundant switching planes in packet switches and a switch for carrying out the method", corresponding to the Swedish patent application SE A 9300484-4, filed 15 Feb. 1993 in the name of Ellemtel Utvecklings AB, which is incorporated herein as a reference. However, in the selection procedure of data packets as described therein, data packets are also always selected in the first place from one of the redundant planes. A choice of this preferred plane can be performed in the way described below.

For the handling at the output side some stored variables are required for each currently established connection. They are stored in appropriate data fields in memories or registers indicated at 28 in FIG. 5. For each connection, as specified by the contents of the field "VPI/VCI" in the data packet, there is thus a pointer or indicator "current_plane" indicating the switching plane preferred at the current instant, from which data packets are taken in the first place. Further, there is, specifically for a considered connection and for each switching plane a few variables, comprising a quality value "quality" and a value "CSNexp" for the expected sequential number of the next data packet which is to arrive to the output side of the switch.

The quality value indicates, founded on the earlier communication of data packets, how good the communication is on the switching plane for the considered connection. As alternatives (these cases are not shown) the quality value can be the same for one switching plane and all active connections ("choice per link") or for each connection from a particular input port ("choice per path") in a manner in line with the discussion above. In the following it is assumed, for facilitating the description, that a low quality value indicates a good communication while a high quality value indicates a worse communication on the considered plane.

Further, there is a variable "Error_Last_Time", also stored in the memory 28 for each combination of connection number and switching plane, which indicates if some error occurred at the reception of a data packet the last time on this switching plane, preferably in regard of only this connection, or as above "per link" or "per path" in other cases (not shown) what would mean that fewer data fields are required in the memory 28 for this variable. In the other cases thus the variable would be valid for reception of packets on this switching plane totally for all active connections or from only a particular input port respectively.

In the following a procedure for among other things choice of a preferred, best switching plane, performed by the selection unit 27 and in particular by the quality unit 26 will be described with reference to flow diagrams and program sequences written in pseudocode for the case where the choice is performed both for each connection and for each plane. In the following, as above, only two switching planes No. 1 and No. 2 are assumed to be arranged in the switch 1.

Figure 6:
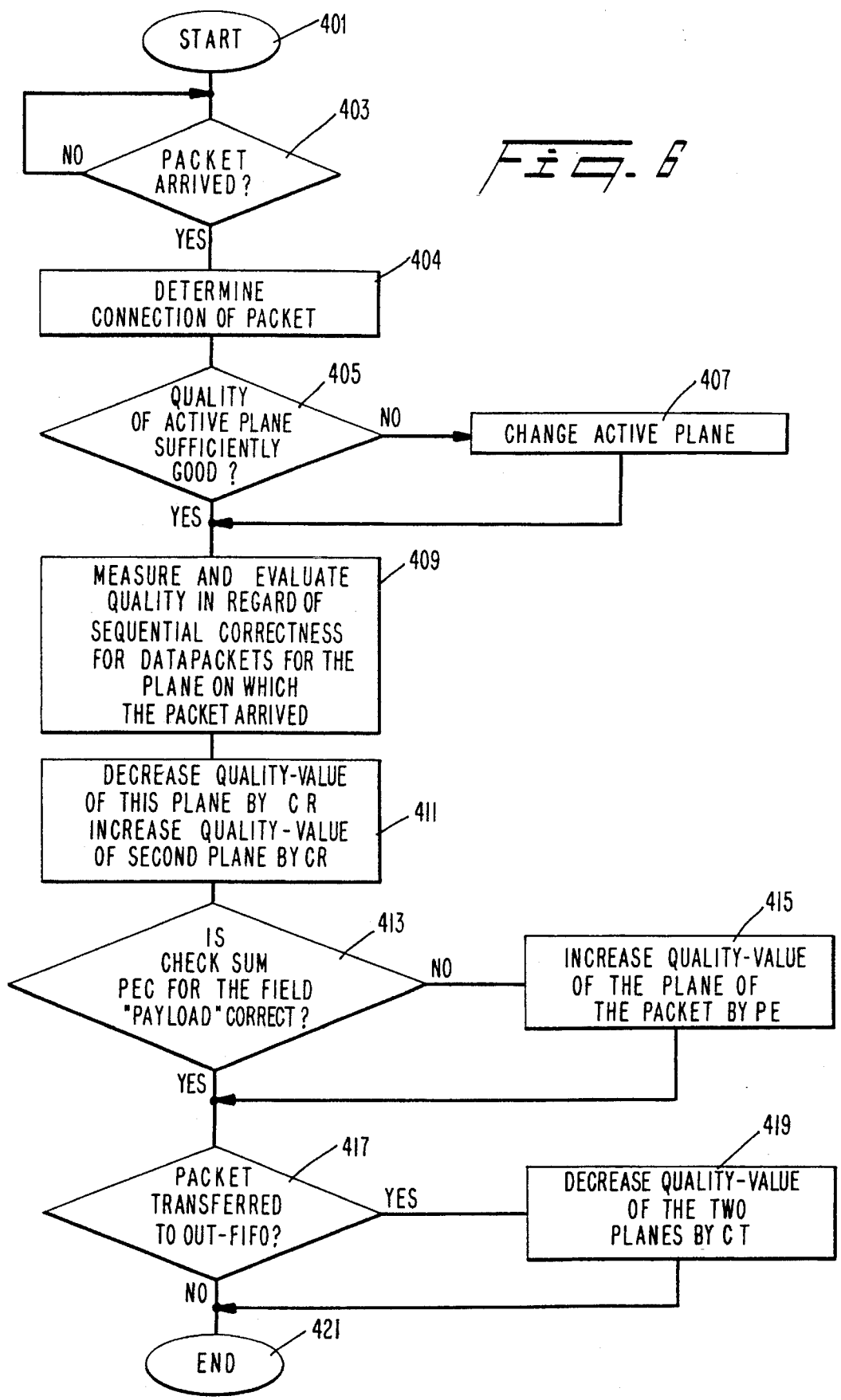
FIG. 6 shows a flow diagram for the choice of active plane.

In FIG. 6 a flow diagram is illustrated for the procedure here of interest which is performed at the output side of the switch 1, i.e. for a portion of the procedures performed in the selection unit 27 and in particular the quality unit 26 of FIG. 5. The procedure starts in a block 401 and then in a block 403 it is determined if any data packet has arrived to either one of the registers 25. If it is decided that it is not the case, the decision is repeated until the reply to the decision in the block 403 is yes, and then in a block 404 the connection, i.e. specifically the number in the field "VCI/VPI", is determined, to which the received packet belongs, by reading this information through lines shown in FIG. 5, from the corresponding register 25. Then a decision is performed in a block 405 whether the quality of the currently active or preferred switching plane is sufficiently good. If it is not the case, the active plane is changed in a block 407. The condition of the block 405 together with the block 407 is apparent from the following short pseudocode routine. "delta" is here a number value providing an hysteresis to the decision of the block 405.

```
if quality(current_plane)−delta>quality(standby_plane)) then
    change plane
```

The preferred plane is thus changed in the block 407 only if the currently preferred plane (indicated by the variable "current_plane") has a quality value ("quality"), which is an amount "delta" worse than the quality of the other plane (indicated by the variable "standby_plane") (in the general case for more than two redundant planes, not as good as the quality of each other plane).

After the test of quality in the block 405 and a possible change of planes in the block 407 a procedure is performed in a block 409 for the measurement and evaluation of the quality in regard of sequential correctness of the data packets earlier and now transmitted on the plane on which the received data cell was transferred. This procedure will be more closely described with reference to the flow diagram of FIG. 7 hereinafter. After this, it is rewarded in a block 411 that a correct data packet has arrived and then the quality value is decremented (a lower quality value means as earlier a higher quality of the plane) for the considered plane by a value "CR" (="Cell Received"), while the quality value of the other switching plane is incremented, i.e. made worse by the same value "CR". If there would be arranged more than two switching planes, the decrement value for the quality value of the plane on which the packet has arrived could suitably differ from the increment value for the other planes, e.g. the latter value can be smaller than the decrement value.

After this it is considered in a block 413, whether there is any error in the data packet field 11 carrying the proper information "Payload", by checking an indication inside the packet if this check sum "PEC", i.e. the check sum related to the field "Payload", has been corrected. If it is true, the quality value is increased (=made worse) with an amount "PE"(= "Payload Error"), and it is performed in a block 415. Then it is checked in a block 417 if the considered data packet has been transferred to the output FIFO register 31 (FIG. 5) to be forwarded from the switch unit 1. If the data packet is a data packet, which thus is forwarded in the output stream of data packets from the switch 1, the quality values of the two switching planes are reduced (=improved) by a value "CT" (= "Cell Transmitted"). After the check in the block 417 and the possible change of the quality values in the block 419 the handling procedure is terminated in a block 421.

Below is given in pseudocode the routine performed in the block 409 in FIG. 6.

```
Procedure(csn_test)
Begin
    if(CSNcell = CSNexp) then
        CSNexp=CSNexp + 1
        report(OK)
        if(Error_Last_Time) then
            report(intruding cell)
            Error_Last_Time:=false
        endif
    else
        if(Error_Last_Time) then
            if(CSNcell=CSNexp + 1) then
                report(single error)
            else
                report(double error)
            endif
            CSNexp:=CSNcell + 1
            Error_Last_Time:=false
        else
            if(CSNcell=CSNexp + 1) then
                report(lost cell)
                CSNexp:=CSNcell + 1
            else
                report(single error)
                Error_Last_Time:=true
            endif
        endif
    endif
``` end

Figure 7:
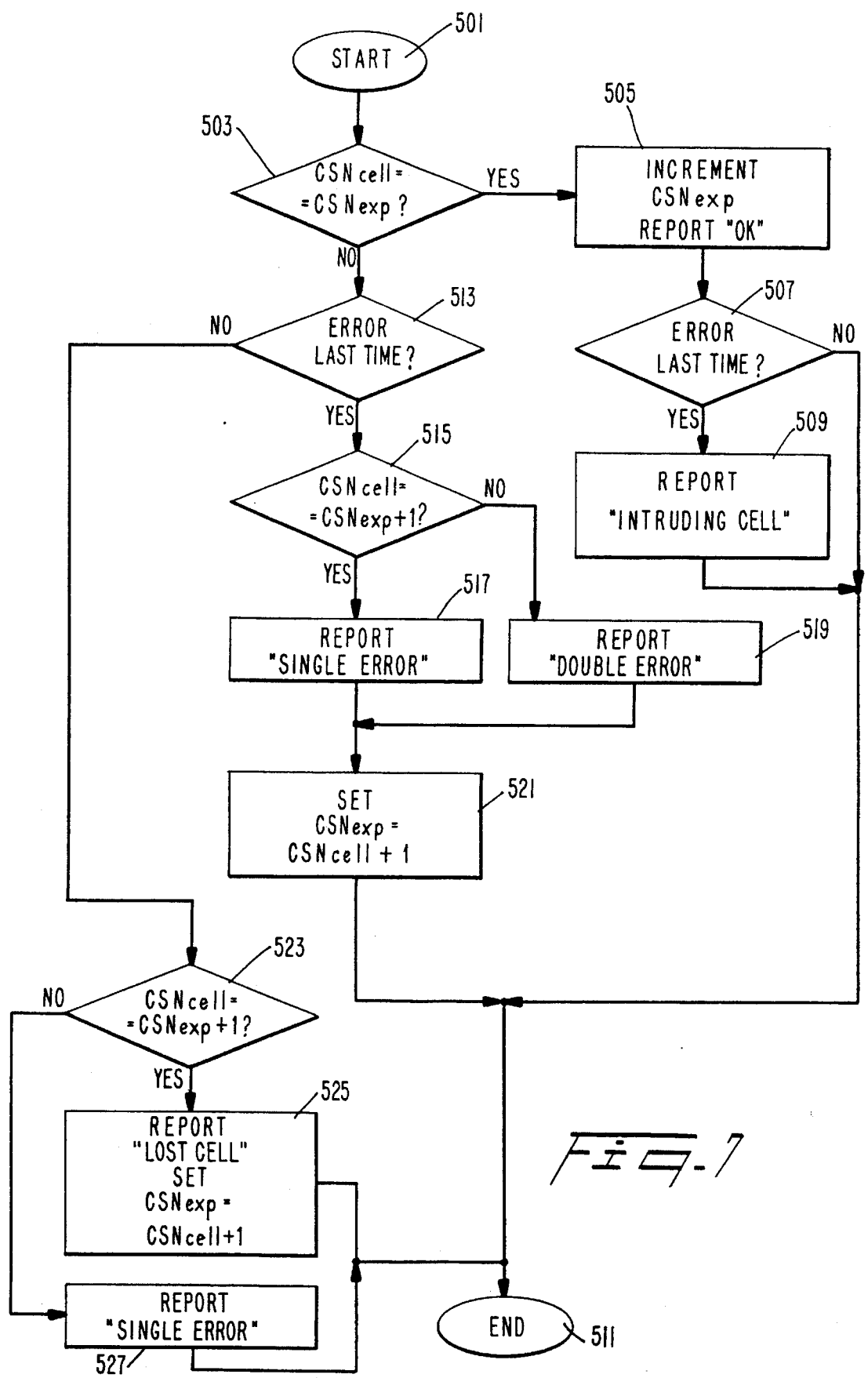
FIG. 7 shows a flow diagram of a subroutine in the evaluation of the best plane, FIG. 8 schematically illustrates an alternative handling of data packets at an output port, FIG. 9 schematically illustrates a packet counter utilized in the handling according to FIG. 8.

In FIG. 7 a flow diagram is illustrated corresponding to this routine. The routine starts in a block 501 and thereafter it is asked in a block 503 whether the sequence number "CSNcell" of the considered cell is equal to the expected sequential number "CSNexp" of the next data packet, which, at the output side of the switch 1, is to be received on this plane for this connection. If it is decided that there is an agreement, i.e. that the data packet arrives in a correct sequential order, in a block 501 the value "CSNexp" of the expected sequential number of the next data packet is increased. Then the value "OK" is reported to a unit, not shown, for an evaluation of the connections. After that it is decided in a block 507 if any error has occurred the last time at the reception of a data packet in this plane, by checking the variable "Error_Last_Time" mentioned above. If there was an error the last time, the value "intruding cell" is reported in a block 509 to the evaluation unit. After the blocks 507 and 509 the routine is terminated and the program flow is transferred to an end block 511.

If it was decided in the block 503, that the considered data packet does not have the correct sequential order, it is decided in a block 513 whether an error was present the last time, by testing the variable "Error_Last_Time". If there was an error the last time, it is decided in a block 515 if the sequential number "CSNcell" of the considered data packet possibly could be equal to the expected sequential number "CSNexp" increased by one, i.e. if a single data packet has been lost. If it is decided to be true, the value "single error" is in a block 517 reported to the evaluation unit. If it is not the case, instead in a block 519 "double error" is reported. After the blocks 517 and 519, in a block 521 the expected sequential number "CSNexp" valid for this connection and this plane is made equal to the sequential number "CSNcell" of the considered data packet increased by one. After this the routine is terminated in the end block 511.

If it was decided in the block 513, that there was no error the previous time, it is decided in a block 523 if the sequential number "CSNcell" of the considered data packet is equal to the expected sequential number "CSNexp" increased by one, i.e. like in the block 515, if a single data packet has been skipped. If it proves to be the case, in a block 525 the value "lost cell" is reported to the evaluation unit and further, the expected sequential number "CSNexp" is set to be equal to the sequential number "CSNcell" of the considered data packet increased by one. If it was decided in the block 523 that the sequential number "CSNcell" of the considered data packet does not agree with the sequential number of the data packet after the expected sequential number, in a block 527 the value "single error" is reported to the evaluation unit. After the blocks 525 and 527 respectively the routine is terminated in the block 511.

The various reported values "OK", "lost cell", "single error", "double error", "intruding cell" can in a not shown evaluation unit be assigned suitable number values or be evaluated in some other way by means of a more complicated algorithm for the modification of the quality value of the considered connection. Below a table is shown indicating the various possible cases in regard of the sequential numbers of the received data packets and the reported values which these various sequences of sequential numbers will generate according to the pseudo code routine above and the flow diagram of FIG. 5.

| Sequential Number (CSNcell) | | | | Situation | Reported Values |
|---|---|---|---|---|---|
| k | k+1 | k+2 | k+3 | correct | OK, OK, OK |
| k | k+2 | k+3 | k+4 | 1 lost packet | lc, OK, OK |
| k | k+2 | k+4 | k+5 | 2 lost packets | lc, lc, OK |
| k | k+2 | k' | k'+1 | 1 lost packet, new sequence | lc, se, OK |
| k | k' | k+1 | k+2 | 1 incorrect packet | se, ic, OK |
| k | k' | k+2 | k+3 | 1 incorrect packet, 1 lost packet | se, se, OK |
| k | k' | k'+1 | k'+2 | new sequence | se, de, OK |
| k | k' | k'' | k''+1 | 1 incorrect packet, new sequence | se, de, OK |

Here the designations "lc" stand for the value "lost cell", "se" for "single error", "de" for "double error", "ic" for "intruding cell".

In the simplest case the various reported values "lc", "se", "de", "ic" are assigned different number values which are directly added to the quality value. A choice giving a rather good performance of the procedure can be the following lc=2
ic=5
se=10
de=100 while the reported value "OK" naturally does not give any change of the quality value, i.e. "OK" is set equal to 0.

The corresponding values for the decrement and increment values "PE" (=Payload Error) and "CT" (=Cell Transmitted) described with reference to FIG. 6 can be

PE=2
CT=1 and the balancing increment and decrement value "CR" (=Cell Received) may be set equal to 1.

In a simplified procedure, which only can be applied for the case with two switching planes, there is only one quality value calculated which is used to indicate the quality of the two planes and in this case is called "Packet_Counter". The handling of the data packets at the output side is in this case illustrated in FIG. 8.

Here it is decided in the units 23 for the testing of check sums of a data packet, whether the check sums "IHEC" and "PEC" are correct and signals indicating the result of the test are transmitted on lines to logic units 33, one logic unit 33 being provided for each redundancy plane. The registers 25 may in this case accommodate for instance maximally two data packets and from a data packet stored in a register 25 the connection number "VPI/VCI" of the packet is read and transmitted on a line to the corresponding logic unit 33.

The two logic units 33 read data from a common memory 35 corresponding to the memories 28 in FIG. 5. When a logic unit wants to write or read data from the common memory 35, the logic unit sends a signal on a line to an access unit 37, which, controlled by suitable synchronizing pulses, monitors that only one logic unit at each instant will have access to the memory 35. In the memory 35, for each connection given by the number in the field "VPI/VCI", the common quality value "Packet_Counter" is stored and in the shape of a variable "Active_Plane" an indication of the plane which is currently active. In its other parts the processing at the output side according to FIG. 8 coincides with the processing as illustrated in FIG. 5, except a special function which will be described in detail hereinafter.

The common quality value "Packet_Counter" is illustrated graphically in FIG. 9. For each received correct data packet from plane 1 the variable "Packet counter" is incremented by one unit and for each received data packet from plane 2 the value of "Packet_Counter" is decremented one step. Initially the variable "Packet_Counter" has the value zero and it may further for instance be assumed that then packets are taken from a plane 1. Then perhaps the value of "Packet_Counter" decreases and thus will have a successively larger negative value. When it is lower than a negative threshold value "Threshold_Plane_1", plane 2 will instead be active. After this perhaps again the value of "Packet_Counter" will increase to be higher than a positive value "Threshold_Plane_2" and then plane 1 will be active again.

The hysteresis is given by the difference of the threshold values "Threshold_Plane_1" and "Threshold_Plane_1", which corresponds to the constant "delta" mentioned above.

In the logic unit 33 for the handling of data packets from plane 1 a procedure is performed which appears from the following program segment written in pseudocode and is also illustrated in the flow diagram in FIG. 12.

```
Process_Logic_Plane_1
Begin
    if(IHEC_error) then                      :For an error in
        "Discard the packet"                 :IHEC the packet is
                                             :always to be
                                             :discarded.
    else
        if(Active_Plane == 1) then           :If the plane 1 is
            "Accept the packet"              :active, the packet
                                             :is to be allowed to
                                             :pass.
        else                                 :Plane 2 active
            if(Packet_Counter ≥              :Check if change of
                Threshold_Plane_2) then      :plane is to be made
                "Accept the packet"          :Change of plane is
                Active_Plane:=1              :to be performed and
                                             :then the packet is
                                             :allowed to pass.
            else                             :When plane 2 is
                "Discard the packet"         :active and a change
            endif                            :is not made, the
        endif                                :packet is discarded.
        if(PEC_error) then
            Packet_Counter:=Packet_Counter   :The packet counter
        else                                 :is increased only
            Packet_Counter:=                 :for correct packets.
                Packet_Counter + 1
        endif
    endif
end
```

The corresponding routine for the logic unit 33 for the plane No. 2 is obtained by swapping the plane numbers and by the fact that "Packet_Counter" is decreased instead of increased.

In the corresponding flow diagram in FIG. 12 the procedure starts in a start block 1201, whereafter it is decided in a block 1203 whether the check sum IHEC of the present data packet is incorrect. If this is the case, the packet is always discarded in a block 1205 and the procedure is terminated in an end block 1207. However, if the check sum is determined to be correct, it is determined in a block 1209, whether the currently active plane is plane 1, i.e. the plane to which the illustrated procedure applies. If it is the case, the data packet is allowed to pass to the output buffer 31 in a block 1211.

If it was decided in the block 1209, that plane 1 is not active, then plane 2 must be active and then it is to be tested whether a change of active plane is to be performed. It is made in a block 1213, where it is determined if the value of the variable "Packet_Counter" is larger than or equal to the constant threshold vale "Threshold_Plane_2". If it is decided not to be the case, no change of plane is to be performed and then the data packet is discarded in a block 1215. When instead the reply to the comparison is yes, a plane change is to be performed and then in a block 1217 the packet is first allowed to pass to the output buffer 31 and then the active plane is set to be plane No. 1.

Then it is performed in a block 1219, to which the procedure continues also from the blocks 1211 and 1215, a test if the check sum "PEC" for the data packet is incorrect. If it is the case, nothing more is to be performed and the procedure is terminated in the end block 1207. If instead the check sum is decided to be correct, the data packet is obviously correctly transmitted through the switch and therefore in a block 1221 the value of "Packet_Counter" is increased. Then the procedure is terminated in the block 1207.

The logical circuits handling the termination of the communication of data packets on the redundant switching planes, have the task of determining, departing from two packet streams, those packets which are allowed to be forwarded. In some cases it may however be necessary to let a superior processor force a control of the redundancy termination. An example of such a case is when performing installation work or updates in a working system. By forcing the redundancy termination to select packets from a particular switching plane, work may be performed on the other plane.

The forced control can be performed by providing each packet with two bits A, B, informing the logical circuits at the output side on the plane, from which the packets are to be taken. These two bits can be added at the input to the switch 1 in the unit 7 (FIG. 4) for generation of redundancy information. The format of the data packet at its passage on the redundant planes may then be as illustrated in FIG. 11. Here there is an extra control byte 39, containing the bits A, B.

The control bits A, B can be coded according to the following table:

| Bit: | A | B | |
|------|---|---|---|
| | 0 | 0 | : Handled by the general redundancy procedure |
| | 0 | 1 | : Packets are only taken from plane 2. All packets from plane 1 are discarded |
| | 1 | 0 | : Packets are only taken from plane 1, all packets from plane 2 are discarded |
| | 1 | 1 | : All packets from the two planes are allowed to pass |

Since the plane choice bits A, B are carried by all packets communicated through the switch 1, an arbitrary connection may be unconditionally controlled by a superior processor.

Control signalling from the two switching planes is an example when a forced control of the redundancy termination advantageously can be used. When the switching plane 1 wants to transmit control signals to the processor, it sets the plane choice bits A, B to 1 and 0 respectively. The redundancy termination will then handle these packets in a special way according to the above. The switching plane B sets the plane choice bits A, B to 0, 1 respectively to ensure that its packets will be allowed to pass through the redundancy termination.

The redundancy termination by means of the plane choice bits are suitably performed directly before the general termination and a possible embodiment is illustrated in FIG. 8. The plane choice bits A, B are taken from the data packet in the register 25, and they form input signals to a simple logic network. From the register 25 receiving data packets communicated on plane 1, thus the A bit is directly fed to the output logic 33 of this plane and signals when being high or set (=1), that the data packet in the register 25 is to be forwarded and be directly transferred to the output buffer 31. Further the A bit is fed after inversion to one input of an AND-gate 39 and the B-bit without inversion to the other input of the AND-gate 39. On the output terminal of the AND-gate 39 a signal is then obtained which is fed to the output logic 39 indicating that the data packet is to be discarded without any more testing. For the register 25 receiving packets from plane 2 the logical network is similar except for the fact that the plane choice bits A, B are inverted in their meaning. If none of the two signals from this logic, i.e. that none of the direct A bit and the output signal from the AND-gate 33 is active or equal to one, the normal redundancy termination is to be performed, as has been described earlier.

As an alternative to the method that the plane choice bits are carried by each data packet communicated through the switch, these bits or other control flags may be stored in the memory 28, cf. FIG. 5, for each connection and each plane. In the processing of a communicated data packet at the output side of the switch then these flags are read and may as above decide the handling of the data packet. These stored plane choice flags can be placed in the memory 28 by some suitable logical routine performed in the selection device 27 and are not described in more detail here.

Below is given in pseudocode the logical procedure performed by the logic 33 for plane 1 comprising the above discussed forced control according to FIG. 8.

```
Process _Logic_Plane_1
Begin
    if(Plane_Select==Plane_1) then           :Forced control of
        "Accept the packet"                  :termination by means
    endif                                    :of plane choice bits
    if(Plane_Select==Plane_1&2) then         :A, B.
        "Accept the packet"
    endif
    if(Plane_Select==Plane_2) then
        "Discard the packet"
    else
    Begin
        if(IHEC_error) then                  :For errors in IHEC
            "Discard the packet"             :the packet is to be
                                             :always discarded.
        else                                 :If plane 1 is active
            if(Active_Plane(n)==1) then      :the packet is to be
                "Accept the packet"          :allowed to pass.
            else                             :Plane 2 active:
                if(Packet_Counter(n) ≥       :Check if change of
                    Threshold_Plane 2) then  :planes is to be
                                             :made.
                    "Accept the packet"      :Change of plane is
                    Active_Plane(n):=1       :to be made and then
                                             :the packet is
                                             :allowed to pass.
                else                         :When plane 2 is
                    "Discard the packet"     :active and a change
                endif                        :is not made the
            endif                            :packet is discarded.
        if(PEC_error) then
            Packet_Counter(n):=              :The packet counter
                Packet_Counter(n)            :is increased only
        else                                 :for correct packets.
            Packet_Counter(n):=
                Packet_Counter(n) + 1
        endif
    endif
    end
end
```

The corresponding procedure for the logic of handling of data packets from plane 2 is given by the following pseudo code routine:

```
Process_Logic_Plane_2
Begin
    if(Plane_select==Plane_2) then           :Forced control of
        "Accept the packet"                  :termination by means
    endif                                    :plane choice bits
    if(Plane_Select==Plane_1&2) then         :A, B.
        "Accept the packet"
    endif
    if(Plane_Select==Plane_1) then
        "Discard the packet"
    else
    Begin
        if(IHEC_error) then                  :For errors in IHEC
            "Discard the packet"             :the packet is always
                                             :to be discarded.
        else                                 :If plane 1 is
            if(Active_Plane(n)==2) then      :active the packet is
                "Accept the packet"          :allowed to pass.
            else                             :Plane 2 active:
                if(Packet_Counter(n) ≥       :Test if change of
                    Threshold_Plane_1) then  :plane is to be
                                             :performed.
                    "Accept the packet"      :Change of plane is
                    Active_Plane(n):=2       :to be performed and
                                             :then the packet is
                                             :allowed to pass.
                else                         :When plane 2 is
                    "Discard the packet"     :active and a change
                endif                        :is not made, the
            endif                            :packet is discarded.
        if(PEC_error) then
            Packet_Counter(n):=              :The packet counter
                Packet_Counter(n)            :is decreased only
        else                                 :for correct packets.
            Packet_Counter(n):=
                Packet_Counter(n) - 1
        endif
    endif
    end
end
```

In these routines the variable "Plane_Select" is used as a collective designation of the two plane choice bits A, B. Further, n signifies the connection number of the data packet given by the contents of the field "VPI/VCI". For each connection there is then a variable "Active_Plane(n)", pointing to the currently active switching plane. The packet counter "Packet_Counter(n)" will then also be particular for each connection and dependent on n.

In order to agree with the first routine above for plane 1 the flow diagram in FIG. 12 must be modified somewhat, as is illustrated in FIG. 13. Some variables are to be made dependant on the connection number of the data packet and further the forced control is illustrated. The blocks 1301–1321 in FIG. 13 thus coincide essentially with the blocks 1201–1221 in FIG. 12. Between the start block 1301 and the block 1303 a sequence is inserted starting with a block 1351, in which it is determined if bit A of the data packet is set. If it is decided to be the case, the packet is always allowed to pass in a block 1353, whereafter the procedure is terminated in the end block 1307. If bit A is not set, it is decided in a block 1355 whether bit B is set. If it is the case, the packet is always discarded in a block 1357, after which the procedure is terminated in the block 1307. If instead bit B is decided not to be set in the block 1355—and then bit A not set either—the procedure continues to the block 1303, which coincides with the block 1203 in FIG. 12. The blocks 1309, 1313, 1317, 1321 correspond to the blocks 1209, 1213, 1217, 1221 but apply in the respective cases only for "this connection", i.e. the connection to which the processed data packet belongs.

What is claimed is:

1. In a packet switch comprising an input side including an input unit for receiving a sequence of data packets arriving at the switch; an output side including an output unit for forwarding the sequence of data packets from the switch; and at least two identical switching planes, each having an input coupled to receive the sequence of data packets from the input unit and coupled to provide the sequence of data packets to the output unit, a method for forwarding, from the output unit, the sequence of data packets, comprising the steps of:

at the input unit receiving the sequence of data packets and supplying the sequence of data packets to each of the switching planes;

at each of the switching planes, supplying the sequence of data packets to the output unit; and at the output unit, for each arriving data packet in the sequence of data packets, selecting a preferred switching plane from the at least two identical switching planes, and receiving from the preferred switching plane a preferred data packet to be forwarded from the output unit, wherein the step of selecting comprises:

generating, for each of the switching planes, a corresponding quality value based on earlier arriving data packets that have been supplied to the output unit, the quality value indicating to what extent the switching plane has transmitted without error, from the input unit to the output unit, the earlier arriving data packets;

using the quality values to select the preferred switching plane.

2. The method of claim 1, wherein the step of generating a quality value for a corresponding switching plane comprises determining from the earlier arriving data packets a sequential order of the earlier arriving data packets.

3. The method of claim 1, wherein the step of generating a quality value for a corresponding switching plane comprises determining from the earlier arriving data packets a correctness of at least one data field inside each of the earlier arriving data packets.

4. The method of claim 1, wherein the step of generating a quality value for a corresponding switching plane comprises;

detecting an incorrectness associated with an erroneous one of the earlier arriving data packets; and in response to detecting the incorrectness, adjusting a previously determined quality value to indicate a worse quality value.

5. The method of claim 4, wherein the incorrectness includes the erroneous one of the earlier arriving data packets arriving out of sequence.

6. The method of claim 5, wherein the incorrectness includes the erroneous one of the earlier arriving data packets having an incorrect data field.

7. The method of claim 1, wherein the step of using the quality values to select the preferred switching plane includes comparing relative sizes of the corresponding quality values.

8. The method of claim 1, wherein the step of using the quality values to select the preferred switching plane includes:

comparing relative sizes of the corresponding quality values; and selecting as the preferred switching plane a higher quality one of the at least two switching planes, the higher quality switching plane having a corresponding quality value that is better or higher by a predetermined amount over a corresponding quality value of a currently preferred switching plane.

9. The method of claim 1, wherein the step of generating a quality value for a corresponding switching plane comprises:

detecting a correctness associated with a good one of the earlier arriving data packets; and in response to detecting the correctness, adjusting a previously determined quality value of a corresponding switching plane to indicate an improved quality value, and adjusting a previously determined quality value of a corresponding other switching plane to indicate a worse quality value.

10. The method of claim 1, wherein the step of selecting the preferred switching plane is performed each time a data packet is supplied to the output unit.

11. The method of claim 1, wherein the step of selecting the preferred switching plane includes continuing to select a previously determined preferred switching plane until a new quality value of a corresponding other switching plane indicates higher quality, by at least a predetermined amount, than a previous quality value of the previously determined preferred switching plane.

12. The method of claim 1, wherein the input side includes other input units in addition to the input unit, each of the other input units supplying corresponding other sequences of data packets to each of the switching planes, and wherein the method further comprises the step of, at the output unit repeating, for each other input unit, the step of selecting, so as to select for each other input unit, a corresponding other preferred switching plane from the at least two identical switching planes.

13. The method of claim 12, wherein for each repetition of the step of selecting, the earlier arriving data packets all originate from a corresponding same one of the other input units.

14. The method of claim 1, wherein each data packet communicated through the switch belongs to a corresponding one of a plurality of established connections, and wherein the method further comprises the step of, at the output unit repeating, for each established connection, the step of selecting, so as to select for each established connection, a corresponding preferred switching plane from the at least two identical switching planes.

15. The method of claim 14, wherein for each repetition of the step of selecting, the earlier arriving data packets all belong to a corresponding same one of the plurality of established connections.

16. The method of claim 15, wherein for each connection, new quality values for the switching planes are determined each time a data packet belonging to that connection is supplied to the output unit.

17. The method of claim 1, wherein the at least two identical switching planes comprise only a first switching plane and a second switching plane, and wherein the step of selecting further comprises combining a first quality value, corresponding to the first switching plane, and a second quality value, corresponding to the second switching plane, to produce a common quality value, and wherein the step of using the quality values to select the preferred switching plane comprises using the common quality value to select a preferred switching plane, a good or high common quality value indicating that the first switching plane should be selected as the preferred switching plane, and a bad or low common quality value indicating that the second switching plane should be selected as the preferred switching plane.

18. The method of claim 17, wherein, in response to a correct transfer of a data packet from the input unit to the output unit through the first switching plane, the common quality value is increased one step, and wherein, in response to a correct transfer of a data packet from the input unit to the output unit through the second switching plane, the common quality value is decreased one step.

19. The method of claim 18, wherein the first switching plane is selected as the preferred switching plane in response to the common quality value being better or higher than a first threshold value, the second switching plane is selected as the preferred switching plane in response to the common quality value being worse or lower than a second threshold value, and wherein the first threshold value is better or higher than the second threshold value.

20. The method of claim 19, wherein, when the first switching plane is the preferred switching plane, the second switching plane becomes the preferred switching plane in response to the common quality value being changed to a value that is worse or lower than the second threshold value, and wherein, when the second switching plane is the preferred switching plane, the first switching plane becomes the preferred switching plane in response to the common quality value being changed to a value that is better or higher than the first threshold value.

21. A data packet switch for transferring data packets, comprising:
    an input side including at least one input unit for receiving data packets arriving at the switch;
    an output side having at least one output unit;
    at least two identical switching planes, each coupled to the input side and to the output side; and
    connection establishing means for establishing, through the switching planes, a connection between a first input unit of the at least one input unit and a first output unit of the at least one output unit, whereby a data packet arriving at the first input unit will be transferred through each of the switching planes to the first output unit,
    wherein the first output unit includes:
        forwarding means for forwarding data packets from the first output unit;
        a plurality of buffers, each associated With a corresponding one of the switching planes, and each for storing at least one data packet received from the corresponding one of the switching planes;
        a pointer for indicating a currently preferred one of the switching planes;
        a selection device, coupled to the pointer, for selecting the preferred switching plane as a source of data packets to be forwarded by the forwarding means;
        a quality determining unit, coupled to each of the switching planes, for repeatedly determining, for each switching plane, a corresponding quality value based on earlier arriving data packets that were received on that switching plane;
        a plurality of quality value storing means, each corresponding to one of the switching planes and each coupled to the quality determining unit, for storing a corresponding quality value;
        pointer setting means, coupled to the plurality of quality value storing means and to the pointer, for setting the pointer to indicate the preferred switching plane in dependence on stored quality values.

22. The data packet switch of claim 21, wherein the quality determining unit comprises:
    evaluation means for evaluating, for each switching plane, characteristics of data packets arriving on that switching plane, the evaluation means including means for determining correctness of a sequential order in which data packets are received from that switching plane.

23. The data packet switch of claim 21, wherein the quality determining unit comprises:
    evaluation means for evaluating, for each switching plane, characteristics of data packets arriving on that switching plane, the evaluation means including means for determining correctness of at least one data field inside each packet that is received from that switching plane.

24. The data packet switch of claim 21, wherein the quality determining unit generates, in response to an incorrectness associated with a data packet received from one of the switching planes, a quality value for that switching plane that is worse or lower than a previously generated quality value for that switching plane.

25. The data packet switch of claim 24, wherein the quality determining unit includes means for determining correctness of a sequential order in which data packets are received from one of the switching planes.

26. The data packet switch of claim 24, wherein the quality determining unit includes means for determining correctness of at least one data field inside each data packet that is received from one of the switching planes.

27. The data packet switch of claim 21, wherein the pointer setting means includes:
    comparison means for comparing relative sizes of quality values stored in the plurality of quality value storing means; and
    means, coupled to the comparison means, for setting the pointer to indicate the preferred switching plane in dependence on an output of the comparison means.

28. The data packet switch of claim 21, wherein the pointer setting means includes:
    comparison means for comparing relative sizes of quality values stored in the plurality of quality value storing means; and
    means, coupled to the comparison means, for determining the preferred switching plane to be that switching plane having a quality value that is better or higher by a predetermined amount than a previously determined quality value corresponding to a previously determined preferred switching plane.

29. The data packet switch of claim 21, wherein the selection device selects a preferred switching plane each time a data packet is supplied to the output unit.

30. The data packet switch of claim 21, wherein the plurality of buffers comprises, for each of the switching planes, a plurality of buffers, each corresponding to one of the at least one input unit, and each capable of storing at least one data packet,
    and wherein the quality determining unit determines quality values for each input unit of the switch.

31. The data packet switch of claim 30, wherein the pointer comprises a plurality of pointers, each associated with a corresponding one of the at least one input unit,
    and wherein the selection device selects, for receiving a data packet that passed through a particular input unit, the preferred switching plane based on a pointer associated with the particular input unit.

32. The data packet switch of claim 21, wherein the connection establishing means establishes a plurality of logical connections through the switching planes, and assigns to each data packet belonging to an information message, a same one of the plurality of logical connections,
    and wherein each of the plurality of buffers comprises a buffer for each logical connection, and wherein each of the plurality of quality value storing means comprises means for storing a quality value for each of the plurality of logical connections.

33. The data packet switch of claim 32, wherein the pointer comprises a plurality of pointers, each associated with a particular one of the plurality of logical connections, and wherein the selection device selects, for receiving a data packet that passed through a particular logical connection, the preferred switching plane based on a pointer associated with the particular logical connection.

34. The data packet switch of claim 33, wherein for each of the plurality of logical connections, the selection device selects a corresponding preferred switching plane each time a data packet is supplied to the output unit from that logical connection.

35. The data packet switch of claim 21, wherein the quality determining unit comprises correctness determining means for determining, for each switching plane, correctness of data packets arriving on that switching plane, and wherein the quality determining unit generates, in response to the correctness determining means indicating correctness of an arriving data packet, a new quality value for a corresponding switching plane, the new quality value being better or higher than a previously generated quality value.

36. The data packet switch of claim 35, wherein the quality determining unit generates, in response to the correctness determining means indicating correctness of a data packet received from the corresponding switching plane, a second new quality value for at least one other switching plane, the second new quality value being worse or lower than a previously generated second quality value for the at least one other switching plane.

37. The data packet switch of claim 21, wherein the at least two identical switching planes comprise only a first switching plane and a second switching plane, wherein the quality determining unit further comprises means for combining a first quality value, corresponding to the first switching plane, and a second quality value, corresponding to the second switching plane, to produce a common quality, wherein a good or high common quality value indicates that the first switching plane should be selected as the preferred switching plane, and a bad or low common quality value indicates that the second switching plane should be selected as the preferred switching plane.

38. The data packet switch of claim 37, wherein the quality determining unit comprises correctness determining means for determining, for each switching plane, correctness of data packets arriving on that switching plane, and wherein the quality determining unit generates, in response to the correctness determining means indicating correctness of an arriving data packet from the first switching plane, a new common quality value that is better or higher than a previously generated common quality value, and wherein the quality determining unit generates, in response to the correctness determining means indicating correctness of an arriving data packet from the second switching plane, a new common quality value that is worse or lower than the previously generated common quality value.

39. The data packet switch of claim 37, wherein the pointer setting means selects the first switching plane as the preferred switching plane in response to the common quality value being better or higher than a first threshold value, and selects the second switching plane as the preferred switching plane in response to the common quality value being worse or lower than a second threshold value, and wherein the first threshold value is better or higher than the second threshold value.

40. The data packet switch of claim 39, wherein, the pointer setting means includes means, responsive to the first switching plane being the preferred switching plane and the common quality value being changed to a value that is worse or lower than the second threshold value, for making the second switching plane the preferred switching plane; and means, responsive to the second switching plane being the preferred switching plane and the common quality value being changed to a value that is better or higher than the first threshold value, for making the first switching plane the preferred switching plane.

41. The data packet switch of claim 21, wherein each data packet transferred to an output unit has control information contained therein, the control information relating to processing of the packet, wherein each of the plurality of buffers includes means for extracting the control information from a data packet stored in the buffer, and for supplying this information to the selection device, and wherein the selection device alternatively forwards the data packet, discards the data packet, or selects a data packet transferred on the switching plane indicated by the pointer, the selection in the latter case being made in such a way that a stream of data packets is forwarded from the forwarding means, the forwarded stream resembling as closely as possible a stream of data packets that arrive at the first input unit.

* * * * *

UNITED STATES PATENT AND TRADEMARK OFFICE
CERTIFICATE OF CORRECTION

PATENT NO. : 5,485,453
DATED : January 16, 1996
INVENTOR(S) : Wahlman et al.

It is certified that error appears in the above-indentified patent and that said Letters Patent is hereby corrected as shown below:

On the Title Page, at item [22], change "Filed: Feb. 15, 1995" to --Filed: Feb. 15, 1994--.

Signed and Sealed this

Eighteenth Day of June, 1996

Attest:

BRUCE LEHMAN

Attesting Officer                Commissioner of Patents and Trademarks